Oct. 23, 1928.
K. FEILCKE
1,688,578
WINDSHIELD REGULATOR
Filed Aug. 2, 1923
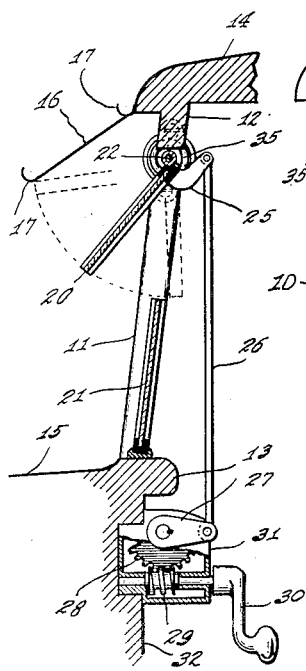
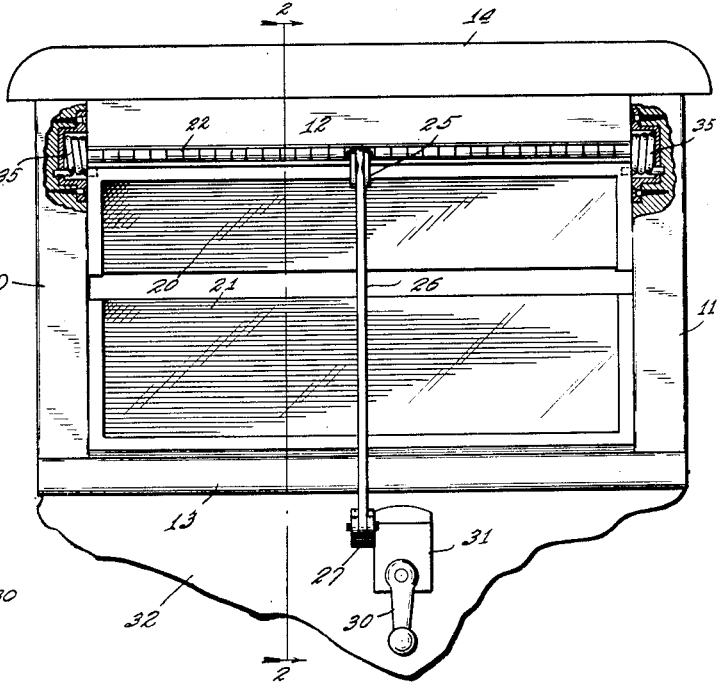
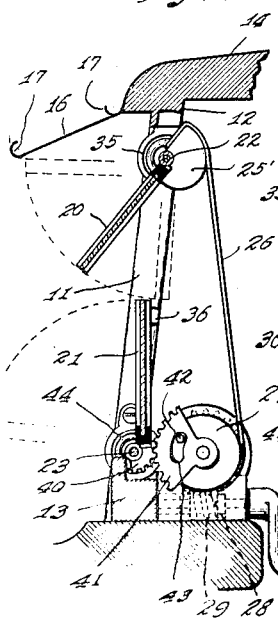
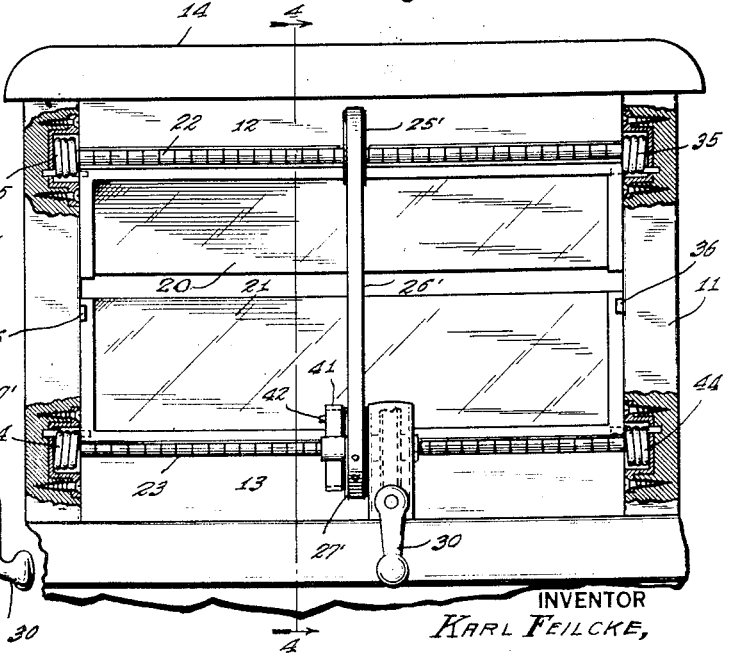
INVENTOR
KARL FEILCKE,
BY
ATTORNEY Patented Oct. 23, 1928.

1,688,578

UNITED STATES PATENT OFFICE.

KARL FEILCKE, OF INDIANAPOLIS, INDIANA.

WINDSHIELD REGULATOR.

Application filed August 2, 1923. Serial No. 655,345.

In the present type of automobile windshields, the adjustment to suit various weather and road conditions is so difficult that it cannot safely be made while driving. The driver must exert considerable force, and frequently must leave his seat and sometimes even get out of the car. Almost universally it is necessary to stop the car in order to make the adjustment safely and comfortably. As a result, the proper and desirable windshield adjustment for safety and comfort is usually not made at all; and when it is made, it usually requires the driver to stop the car if made with safety, or certainly takes his attention from his driving if he attempts to continue in motion.

This inability to get proper adjustment easily while in motion results in much discomfort, and many accidents. Frequently the driver does not know the desired adjustment before he starts, or weather and road conditions so change that a different adjustment is desired; but he usually does not take the trouble to stop the car when he finds what adjustment is proper. On the one hand, he fails to make a proper adjustment, and thereby not only frequently keeps himself and the other occupants of the car uncomfortable, but also is apt to have serious accidents by reason of his inability to see properly. On the other hand, if he tries to make his adjustment while driving, it is such an effort that it inevitably takes his attention from his driving, and that is very apt to produce accidents.

It is the object of my invention to provide an irreversible or self-locking windshield-adjusting device which permits such convenient operation of the windshield that it avoids the necessity for the driver to stop his car, leave his seat, or take his eyes from the road, and makes it possible for him to get any desired adjustment safely and easily with one hand while operating his car; to provide operating means for adjusting one section of a windshield to a number of different positions, and for jointly operating the other section during only part of the operation of the first section; and to provide spring means tending to move a windshield section to one limit of its movement, while permitting it to be moved in the other direction, so that the windshield section will be held from rattling, the power required for swinging the windshield section in one direction will be reduced, and tension-transmission members may be used for operating the windshield section.

The accompanying drawings illustrate my invention: Fig. 1 is a rear elevation of a windshield embodying one form of my invention, with the upper windshield section movable and the lower section fixed; Fig. 2 is a section on the line 2—2 of Fig. 1; Fig. 3 is a view similar to Fig. 1, showing another form of my invention, with both sections of the windshield adjustable; and Fig. 4 is a section on the line 4—4 of Fig. 3.

The windshield may be mounted in any usual windshield frame, having two side uprights 10 and 11 usually between upper and lower horizontal members 12 and 13. Both of these horizontal members may be parts of other elements of the automobile, as of the top 14 and cowl 15 respectively. The top 14 is shown as being provided with a visor 16, with transverse water-draining eaves-troughs 17 on both the visor and the front edge of the top 14 for assisting in keeping the windshield proper free from water; though this is merely incidental.

The windshield usually comprises an upper section 20 and a lower section 21. The upper section is hinge-mounted on hinges or pivots 22 along the upper edge of such section. These hinges 22 are shown as between the upper edge of the windshield 20 and the upper horizontal member 12, but this is not essential. In the form of my invention shown in Figs. 1 and 2, the lower windshield section 21 is stationary; but such lower section also may be hinge-mounted, and is so shown in the form of my invention shown in Figs. 3 and 4, the hinge mounting shown being along the lower edge of such section 21 by hinges 23 between such lower edge and the lower horizontal member 13.

In the arrangement shown in Figs. 1 and 2, where only the upper windshield section 20 is adjustable, such upper section has a rearwardly and upwardly extending arm 25, preferably from about the middle of the upper edge of the frame of such section. The end of this arm 25 is connected by a link 26 to an arm 27 fast to a worm-wheel segment 28 which meshes with a worm 29 rotatable by a crank 30. The parts 27, 28, and 29 are mounted in a suitable casing 31 which is attached to the dash 32 at about the middle thereof so that the crank 30 is conveniently accessible to the right hand of the driver as he sits in the usual driving position on the left-hand side of the front seat of the car. The link 26 extends substantially vertically upward across the middle of the windshield, where it is between the lines of the vision of the two occupants of the front seat; but this location of the link 26 is not essential, and this location is shown merely by way of example.

The driver when driving his car can reach forward and turn the crank 30 as desired, without taking his attention from his driving. By turning the crank 30 in one direction or the other, he may swing the upper windshield section 20 forward or back as desired, to any desired position, of which one is indicated in full lines and several others in dotted lines. This adjustment is easy to make, without requiring any special attention. When the desired adjustment is reached, the driver does not have to fasten anything to retain such adjustment, but merely lets go of the crank 30, and the windshield remains in adjusted position by reason of the irreversible nature of the worm-gearing 28—29.

In addition, I prefer to provide one or more springs 35 tending to move the movable windshield section in one direction; and I prefer that these springs tend to swing the lower edge of the windshield section 20 toward the rear. I show such springs 35 in Figs. 1 and 2 as helical springs which act between the frame of the windshield section 20 and the two uprights 10 and 11, the springs being coiled about the axis of the hinges 22. These springs 35 make it easier to turn the windshield section 20 in one direction. In addition, they prevent the movable windshield section from rattling. Further, if they act in the direction indicated, they confine the stresses on the link 26 to tension stresses; so that such link may be made quite slender, or instead of such link there may be substituted a flexible wire or strap 26' as is indicated in Figs. 3 and 4. When in the form of a strap, the transmission member 26' at its ends preferably passes over arc-shaped member 25' and disk 27' fixed to the windshield section 20 and to the worm-wheel segment 28, instead of being attached to the arms 25 and 27. The springs 35 hold this tension transmission member 26' taut under all conditions.

When the lower windshield section 21 is movably mounted, as shown in Figs. 3 and 4, it may be desired to adjust it by the same crank 30 that adjusts the upper windshield section 20. Ordinarily, however, the lower windshield section 21 is kept in closed position, so that its upper end lies against a stop 36, save when the upper windshield section 20 is opened wide; as it is usually not desirable to move the lower windshield section 21 for any position of the upper windshield section in which the lower edge of such upper windshield section is further to the rear than is shown in full lines in Figs. 2 and 4. To obtain this adjustment of the lower windshield section, I may use the arrangement shown in Figs. 3 and 4. Here the lower windshield section carries a pinion-segment 40 co-axial with the hinges 23, which pinion-segment meshes with a gear segment 41 loose on the shaft of the worm-wheel segment 28 and disk 27' drivingly connected to said disk by a pin-and-slot connection, shown as formed by a pin 42 projecting laterally from the disk 27' through an arc-shaped slot 43 in the gear segment 41. The windshield section 21 is spring-pressed to closed position by springs 44 which act to swing the free edge of such windshield section to the rear in the same way that the springs 35 act to swing the free edge of the upper windshield section 20 to the rear; but the movement of the windshield section 21 produced by the springs 44 is limited by the stops 36.

For the ordinary adjustments of the upper windshield section 20, in which such upper windshield section does not approach wide-open position, the turning of the crank 30 to produce such adjustment of the upper windshield section merely causes the pin 42 to play back and forth in the slot 43, and does not disturb the lower windshield section 21 from its normal position against the stops 36. When in the opening of the upper windshield section 20, however, such upper windshield section reaches about the point shown in full lines in Figs. 2 and 4, the pin 42 reaches the end of the slot 43; and further turning of the crank 30 to open the upper windshield section 20 also causes turning of the gear segment 41, which acts through the gear segment 40 to produce opening of the lower windshield section 21. Preferably, the gear-ratio between the segments 40 and 41 is such that the lower windshield section, once started, moves at a greater angular speed than does the upper windshield section, so that the two windshield sections reach wide-open position at about the same time although the movement of the lower windshield section did not start until rather late in the opening movement of the upper windshield section. When the crank 30 is turned to close the windshield, the lower windshield section at first closes more rapidly, by reason of this same gear ratio, but it is stopped when it strikes the stops 36, which it does while the upper windshield section is still partly open. Thereafter in the closing movement of the crank 30 it is only the upper windshield section which is closed, the pin 42 moving in the slot 43 during this time without affecting the lower windshield section.

By reason of these adjustments, it becomes possible to adjust the windshield while driving the car, and to do so with safety; for the adjustment is made by a natural movement of one hand, while the other hand may be kept on the steering wheel, and the driver's eyes are kept on the road ahead, and no precautions need be taken to fasten the adjusted windshield in adjusted position.

I claim as my invention:

1. In an automobile or other vehicle, a body including a windshield support, a windshield pivotally mounted in said support, spring means tending to turn said windshield about its pivotal axis in one direction, a self-locking crank-operated device mounted on said body, and means for connecting said crank-operated device with said windshield for rotating said windshield against said spring means, said connecting means including a flexible member for transmitting tension only.

2. In an automobile or other vehicle, the combination of a windshield having a plurality of hinged sections, common operating means therefor, and connecting means between said operating means and said two windshield sections for turning them at different rates of speed about their axes, said connecting means being inoperative to move the faster-moving windshield section until the other windshield section has passed a predetermined point in its opening movement.

3. In an automobile or other vehicle, the combination of a windshield having a plurality of hinged sections, common operating means therefor, and connecting means between said operating means and two windshield sections for operating both sections but for operating one during part only of the movement of the other.

4. In an automobile or other vehicle, a body including a windshield support, a windshield having a plurality of sections hinged to said support, common operating means therefor, said operating means being mounted on said body, and connecting means between said operating means and two windshield sections for operating both sections but for operating one during part only of the movement of the other.

5. In an automobile or other vehicle having a body provided with a top and two upright supports for the front end thereof, said supports being laterally spaced to provide an opening between them and below the top, the combination of a windshield, means for pivotally supporting said windshield on a horizontal axis in a position such that it may be swung about its axis of pivotal mounting to open and close the opening below the top and between said front supports thereof, spring means tending to rotate said windshield in one direction about its axis of pivotal mounting, a shaft rotatably mounted in said body on an axis parallel to the pivotal axis of said windshield but spaced from and independent of the pivotal mounting of the windshield, means including a force-transmitting member connected to said windshield at a point eccentric to the pivotal mounting thereof for connecting said shaft to said windshield, whereby rotation of said shaft will cause said windshield to swing about its axis of pivotal mounting, a rotatable operating member for said shaft, and irreversible gearing connecting said shaft and said operating member.

6. In an automobile or other vehicle having a body provided with a top and two upright supports for the front end thereof, said supports being laterally spaced to provide an opening between them and below the top, the combination of a windshield, means for pivotally supporting said windshield on a horizontal axis in a position such that it may be swung about its axis of pivotal mounting to open and close the opening below the top and between said front supports thereof, spring means tending to rotate said windshield in one direction about its axis of pivotal mounting, a shaft rotatably mounted in said body on an axis parallel to the pivotal axis of said windshield but spaced from and independent of the pivotal mounting of the windshield, means including a force-transmitting member connected to said windshield at a point eccentric to the pivotal mounting thereof for connecting said shaft to said windshield, whereby rotation of said shaft will cause said windshield to swing about its axis of pivotal mounting, a rotatable operating member for said shaft, and gearing connecting said shaft and said operating member.

7. In an automobile or other vehicle having a body provided with a top and two upright supports for the front end thereof, said supports being laterally spaced to provide an opening between them and below the top, the combination of a windshield, means for pivotally supporting said windshield on a horizontal axis in a position such that it may be swung about its axis of pivotal mounting to open and close the opening below the top and between said front supports thereof, a shaft rotatably mounted in said body on an axis parallel to the pivotal axis of said windshield but spaced from and independent of the pivotal mounting of the windshield, means including a force-transmitting member connected to said windshield at a point eccentric to the pivotal mounting thereof for connecting said shaft to said windshield, whereby rotation of said shaft will cause said windshield to swing about its axis of pivotal mounting, a rotatable operating member for said shaft, and gearing connecting said shaft and said operating member.

8. In an automobile or other vehicle having a body provided with a top and two upright supports for the front end thereof, said supports being laterally spaced to provide an opening between them and below the top, the combination of a windshield, means for pivotally supporting said windshield on a horizontal axis in a position such that it may be swung about its axis of pivotal mounting to open and close the opening below the top and between said front supports thereof, spring means tending to rotate said windshield in one direction about its axis of pivotal mounting, a self-locking windshield operating device mounted on said body, said operating device including a rotatable operating member and a shaft driven thereby and rotatable on an axis parallel to but spaced from that of said windshield, and means operatively interconnecting said shaft and said windshield whereby rotation of said operating member will cause said windshield to swing about its axis of pivotal mounting.

9. In an automobile or other vehicle having a body provided with a top and two upright supports for the front end thereof, said supports being laterally spaced to provide an opening between them and below the top, the combination of a windshield, means for pivotally supporting said windshield on a horizontal axis in a position such that it may be swung about its axis of pivotal mounting to open and close the opening below the top and between said front supports thereof, a self-locking windshield operating device mounted on said body, said operating device including a rotatable operating member and a shaft driven thereby and rotatable on an axis parallel to but spaced from that of said windshield, and means operatively interconnecting said shaft and said windshield whereby rotation of said operating member will cause said windshield to swing about its axis of pivotal mounting.

10. In an automobile or other vehicle having a body provided with a top and two upright supports for the front end thereof, said supports being laterally spaced to provide an opening between them and below the top, the combination of a plurality of windshield sections pivotally mounted on horizontal parallel axes in the opening below the top and between said supports thereof, a self-locking windshield operating device mounted on said body, said operating device including a rotatable operating member and a shaft driven thereby and rotatable on an axis parallel to but spaced from the axes of said windshield sections, and means operatively interconnecting said shaft and said windshield sections whereby rotation of said operating member will cause said windshield sections to swing about their respective axes.

11. In an automobile or other vehicle having a body provided with a top and two upright supports for the front end thereof, said supports being laterally spaced to provide an opening between them and below the top, the combination of a windshield, means for pivotally supporting said windshield on a horizontal axis in a position such that it may be swung about its axis of pivotal mounting to open and close the opening below the top and between said front supports thereof, operating means for swinging said windshield to various positions of angular adjustment about its axis of pivotal mounting, said operating means including an irreversible power-transmission mechanism, a shaft rotatably mounted on an axis parallel to but spaced from the axis of pivotal mounting of said windshield, and a rotatable operating member for rotating said shaft to cause movement of said windshield about its axis of pivotal mounting.

12. In an automobile or other vehicle having a body provided with a top and two upright supports for the front end thereof, said supports being laterally spaced to provide an opening between them and below the top, the combination of a windshield, means for pivotally supporting said windshield on a horizontal axis in a position such that it may be swung about its axis of pivotal mounting to open and close the opening below the top and between said front supports thereof, spring means tending to rotate said windshield in one direction about its axis of pivotal mounting, a worm gear operatively connected to said windshield and rotatable to cause movement of said windshield about its axis of pivotal mounting, and a manually operable worm associated with said worm wheel.

In witness whereof, I have hereunto set my hand at Indianapolis, Indiana, this 23rd day of July, A. D. one thousand nine hundred and twenty three.

KARL FEILCKE.